(12) United States Patent
Boyer, Jr.

(10) Patent No.: US 12,344,398 B2
(45) Date of Patent: Jul. 1, 2025

(54) DOORWAY PROTECTION ASSEMBLY

(71) Applicant: William J. Boyer, Jr., Lakewood, WA (US)

(72) Inventor: William J. Boyer, Jr., Lakewood, WA (US)

(73) Assignee: B&J IP, LLC, Universal City, TX (US)

( * ) Notice: Subject to any disclaimer, the term of this patent is extended or adjusted under 35 U.S.C. 154(b) by 21 days.

(21) Appl. No.: 18/314,763

(22) Filed: May 9, 2023

(65) Prior Publication Data

US 2023/0365272 A1 Nov. 16, 2023

Related U.S. Application Data

(60) Provisional application No. 63/340,349, filed on May 10, 2022.

(51) Int. Cl.
*B64F 1/00* (2024.01)
*B64C 1/14* (2006.01)

(52) U.S. Cl.
CPC ............ *B64F 1/005* (2013.01); *B64C 1/1415* (2013.01)

(58) Field of Classification Search
CPC .......... B60R 13/04; B60R 13/043; B60R 2013/046; B64C 1/143; B64C 1/1407; B64C 1/1415; B64C 1/1423; B64C 1/1438; B64C 1/1461; B64F 1/005; E06B 7/16; E06B 7/23
USPC .... 52/173.2, 202, 211, 287.1, 288.1, 717.01, 52/717.02; 49/462; 244/129.1
See application file for complete search history.

(56) References Cited

U.S. PATENT DOCUMENTS

| | | | | |
|---|---|---|---|---|
| 1,620,933 A | * | 3/1927 | Wilcox ................ | A47B 95/043 |
| | | | | 174/136 |
| 3,964,223 A | * | 6/1976 | Sato ......................... | B64C 1/20 |
| | | | | 52/246 |
| 4,768,320 A | * | 9/1988 | Weller .................... | E04G 21/30 |
| | | | | 52/211 |
| 4,873,800 A | * | 10/1989 | Frommelt ............ | B65G 69/008 |
| | | | | 52/173.2 |
| 5,312,071 A | * | 5/1994 | Eilenstein-Wiegmann ................ | |
| | | | | B64C 1/1415 |
| | | | | 244/137.1 |
| 5,518,207 A | * | 5/1996 | Nordstrom ............ | B64C 1/1415 |
| | | | | 244/129.4 |
| 6,073,402 A | * | 6/2000 | Moody ................ | B65G 69/008 |
| | | | | 5/709 |

(Continued)

FOREIGN PATENT DOCUMENTS

DE 202010005999 U1 * 8/2010 ............. B60R 13/01

*Primary Examiner* — Joshua E Rodden
(74) *Attorney, Agent, or Firm* — Perkins Coie LLP

(57) ABSTRACT

The present disclosure provides doorway protection assemblies with a base portion and two leg portions that can be positioned over and protect the exterior surrounding a doorway of a vehicle, such as an aircraft, from damage while cargo or other items are being loaded into or unloaded from the vehicle. Each assembly can include one or more attachment portions that wrap over and attach to the door sill area or side jambs of the vehicle doorway in order to secure the assembly in place. Each assembly can include a cushion layer between the various portions and the exterior of the aircraft to further avoid or reduce damage. Each assembly can include retention straps that releasably attach to anchors on the vehicle to further secure the assembly on the vehicle doorway.

19 Claims, 4 Drawing Sheets

(56) References Cited

U.S. PATENT DOCUMENTS

| | | | | |
|---|---|---|---|---|
| 6,357,187 | B1* | 3/2002 | Haldeman | E06B 3/88 |
| | | | | 52/717.06 |
| 8,353,136 | B2* | 1/2013 | Ashelin | B65G 69/008 |
| | | | | 52/173.1 |
| 8,991,113 | B2* | 3/2015 | Metz | B65G 69/008 |
| | | | | 52/173.1 |
| 9,027,629 | B1* | 5/2015 | Laengle | E04G 21/30 |
| | | | | 160/351 |
| 11,168,509 | B2* | 11/2021 | Aust | E04G 21/30 |
| 11,952,098 | B2* | 4/2024 | Chalons | B64C 1/1461 |
| 2004/0088933 | A1* | 5/2004 | Mayes | E04G 21/30 |
| | | | | 52/211 |
| 2005/0102929 | A1* | 5/2005 | Hoffmann | B65G 69/008 |
| | | | | 52/173.2 |
| 2019/0316407 | A1* | 10/2019 | Aust | E06B 1/34 |
| 2020/0284086 | A1* | 9/2020 | Volpe | E06B 1/34 |

* cited by examiner

DOORWAY PROTECTION ASSEMBLY

CROSS-REFERENCE TO RELATED APPLICATION

This non-provisional patent application claims the benefit of and priority to U.S. Provisional Patent Application No. 63/340,349, titled DOORWAY PROTECTION ASSEMBLY, filed May 10, 2022, which is incorporated herein in its entirety by reference thereto.

TECHNICAL FIELD

This application relates to a doorway protection assembly. Some embodiments relate to a doorway protection assembly for an aircraft cargo-hold doorway.

BACKGROUND

When traveling by commercial airplane, passengers often bring at least one piece of baggage onto the plane. If the piece of baggage is unable to be accommodated in the main cabin of the airplane, the piece of baggage is checked so that it may be stored in a baggage storage area within the airplane. The checked bag is tagged and transported out of the airport terminal and placed on a baggage cart to be transported to the airplane for storage. A towing tractor brings the baggage cart to the airplane and a baggage handler transfers the pieces of baggage from the baggage cart to a belt loader. The belt loader includes a conveyor belt used to transport the pieces of baggage up to the baggage storage area in the airplane. As belt loader is positioned relative to the aircraft's cargo-hold doorway, and as luggage or other cargo is loaded into or out of the aircraft, the door sill and perimeter around the opening for the cargo hold can be impacted and damaged. If the damage is substantial enough, the aircraft may be grounded until adequate repairs can be made. Such grounding of an aircraft can be extremely expensive. Other vehicles with cargo hold areas that are loaded and unloaded through cargo-area doorways have similar problems with potential, inadvertent damage around the doorway. There is a need for protection around the aircraft's cargo-hold doorway to protect it from damage.

SUMMARY

The technology of the present disclosure overcomes the above drawbacks and provides additional benefits. For example, one or more embodiments of the present technology provides a doorway protection assembly including a base portion having a first curvature corresponding to a first portion of a vehicle exterior proximate to a vehicle doorway, a first leg portion coupled to a first end portion of the base portion, where the first leg portion has a second curvature corresponding to a second portion of the vehicle exterior proximate to the vehicle doorway, and a second leg portion coupled to a second end portion of the base portion, where the second leg portion has a third curvature corresponding to a third portion of the vehicle exterior proximate to the vehicle doorway.

Another embodiment of the present technology provides a doorway protection assembly for use on an aircraft with a cargo doorway for accessing a cargo area. The assembly comprises a base portion, a first leg portion, and a second leg portion. The base portion has a first curvature corresponding to a first portion of the aircraft proximate to the cargo doorway. The first leg portion is connected to a first end portion of the base portion, wherein the first leg portion has a second curvature corresponding to a second portion of the aircraft proximate to the cargo doorway. The second leg portion is connected to a second end portion of the base portion, wherein the second leg portion has a third curvature corresponding to a third portion of the aircraft proximate to the cargo doorway. The base portion, the first leg portion and second portion are movable as a unit between an installed position proximate to the cargo doorway to protect the first, second and third portions from damage, and a removed position wherein the base portion, the first leg portion and second portion are removed from the aircraft to allow a cargo door to close over the cargo doorway.

Another embodiment of the present technology provides a doorway protection assembly including a base portion configured to protect a first portion of a vehicle exterior proximate to a vehicle doorway, a first leg portion coupled to the base portion, where the first leg portion is configured to protect a second portion of the vehicle exterior proximate to the vehicle doorway, and a second leg portion coupled to the base portion, where the second leg portion is configured to protect a third portion of the vehicle exterior proximate to the vehicle doorway.

Another embodiment of the present technology provides a method of using a doorway protection assembly, including flexing a first leg portion of the assembly and a second leg portion of the assembly toward each other, where the first and second leg portions are coupled to a base portion of the assembly, disposing the assembly in a vehicle doorway such that the base portion covers a first portion of a vehicle exterior below the vehicle doorway, and releasing the first and second leg portions such that the first and second leg portions cover second and third portions of the vehicle exterior to sides of the vehicle doorway.

BRIEF DESCRIPTION OF THE DRAWINGS

A better understanding of the features and advantages of the present disclosure will be obtained by reference to the following detailed description that sets forth illustrative embodiments, in which the principles of the disclosure are utilized, and the accompanying drawings.

Figure 1:
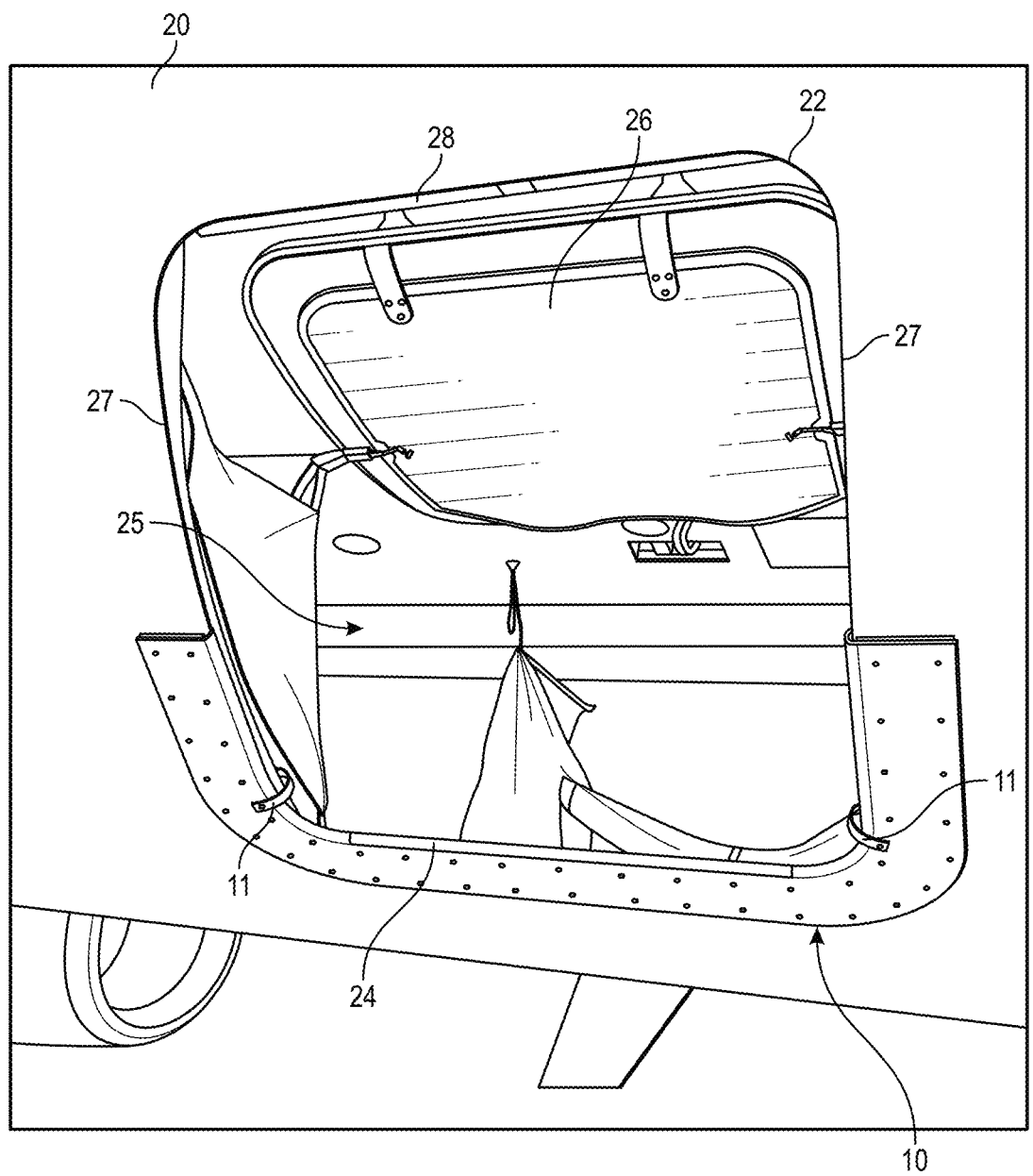
FIG. 1 is a schematic isometric view of a doorway protection assembly in accordance with an embodiment of the present technology.

A person skilled in the relevant art will understand that the features shown in the drawings are for purposes of illustrations, and variations, including different and/or additional features and arrangements thereof, are possible.

DETAILED DESCRIPTION

The present technology is directed to a doorway protection assembly that can be releasably mounted to an aircraft body around at least a portion of the aircraft's doorway to protect the aircraft from damage around the doorway. While the present technology is described herein in connection with an aircraft with a cargo area accessed via a cargo area doorway, other embodiments can be used for doorways in other vehicles for which protection may be desirable. The present technology overcomes drawback experienced in the prior art and provides additional benefits.

FIG. 1 is a schematic isometric view of a doorway protection assembly 10 removably mounted on an aircraft 20 around a portion of a cargo area doorway 22 when a cargo door 26 is open to allow cargo or other items to be moved into or out of a cargo area 25. The doorway protection assembly 10 is configured to be removably installed on a door sill area 24 and portions of side jambs 27 when the cargo door 26 is open to protect the doorway 22 from being impacted by cargo, cargo handling equipment, or other items. The doorway protection assembly 10 includes one or more retention straps 11 that releasably attach to an anchor member within the aircraft's cargo hold to help retain the doorway protection assembly 10 on the door sill area 24 and to avoid inadvertent removal of the doorway protection assembly 10 from the doorway 22 (see FIG. 4). The doorway protection assembly 10 includes one or more layers of impact absorptive material, such as durable foam (see FIGS. 3A and 3B). The doorway protection assembly 10 can be removed after completion of loading or unloading of the cargo, so the cargo door 26 can then be closed (e.g., prior to departure).

In some embodiments, doorway protection assembly 10 can be mounted on a different portion of the doorway 22, such as a head jamb. In some embodiments, the doorway protection assembly 10 can be mounted on a different doorway of the aircraft 20.

Figure 2:
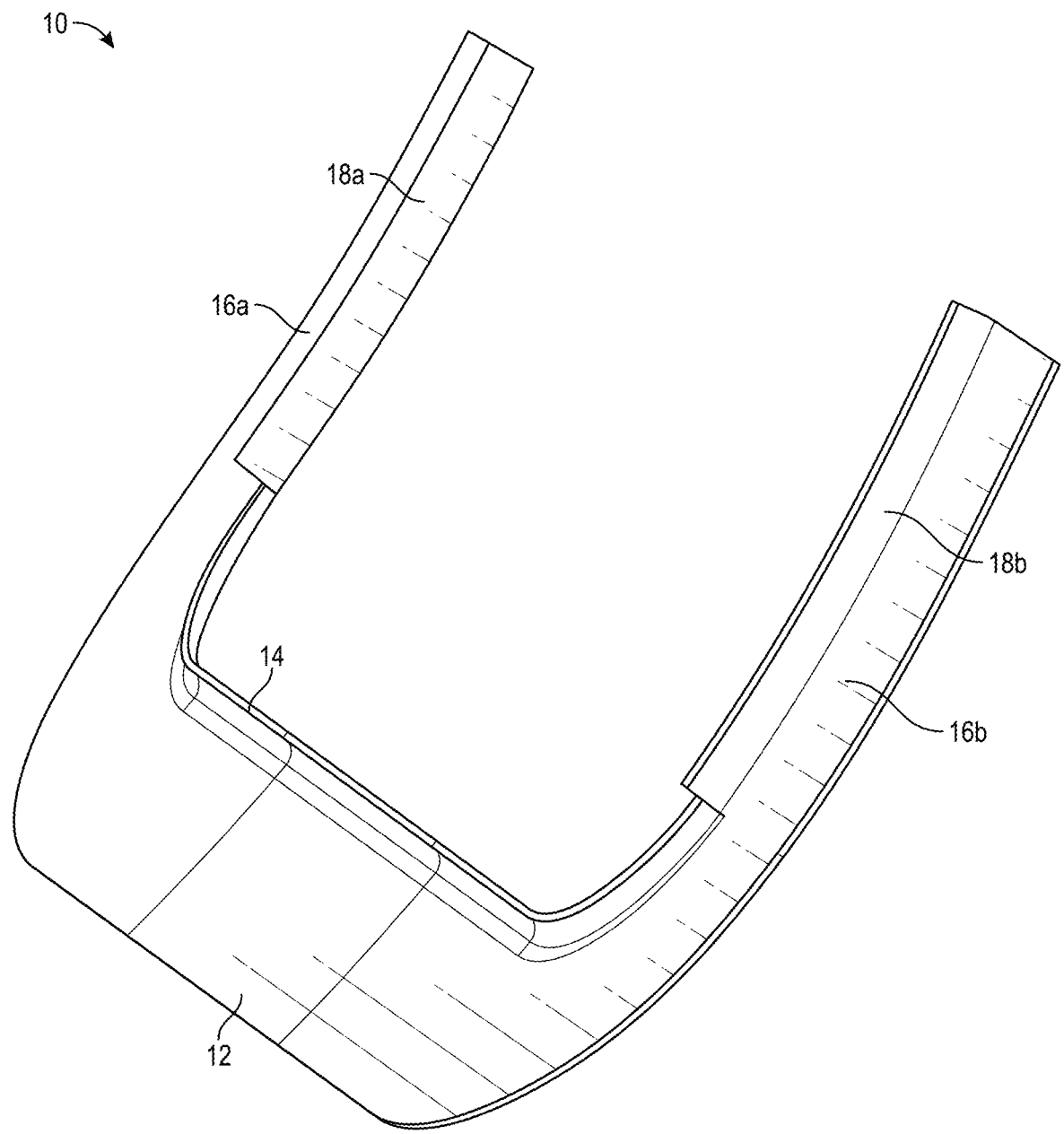
FIG. 2 is a schematic illustration of the doorway protection assembly in accordance with embodiments of the present technology.

FIG. 2 is a schematic isometric view of the doorway protection assembly 10 in accordance with an embodiment of the present technology. In the illustrated embodiment, the doorway protection assembly 10 has a generally U-shaped structure with two leg portions 16a, 16b extending away from opposing sides (i.e., two opposing end portions) of a base portion 12. The base portion 12 has a curvature, shape, or contour that allows the base portion 12 to be mounted against a portion of the aircraft exterior adjacent to the door sill area 24 with minimal footprint. The two leg portions 16a, 16b have curvatures, shapes, or contours that allow the leg portions 16a, 16b to be mounted against a portion of the aircraft exterior adjacent to the side jambs 27 with minimal footprint. The length and curvature of the base portion 12 can be designed and built specific to the dimensions of a particular aircraft model. The curvatures of the leg portions 16a, 16b can also be designed and built specific to the dimensions of a particular aircraft model. The lengths of the leg portions 16a, 16b can be configured to extend along a portion of or the entirety of the side jambs 27. In some embodiments, the base portion 12 and/or the leg portions 16a, 16b can include mechanisms, such as telescoping features, that allow the length and/or curvature of the base portion 12 and/or the leg portions 16a, 16b to be adjustable.

The doorway protection assembly 10 further includes a first attachment portion 14 coupled to the base portion 12, a second attachment portion 18a coupled to the first leg portion 16a, and a third attachment portion 18b coupled to the second leg portion 16b. In the illustrated embodiment, each of the first, second, and third attachment portions 14, 18a, 18b extend continuously along the lengths of the base portion 12, the first leg portion 16a, and the second leg portion 16b, respectively. The first attachment portion 14 has a different curvature and/or length compared to the second and third attachment portions 18a, 18b such that each is optimized to wrap around different portions of the doorway 22 (i.e., the first attachment portion 14a wraps around the door sill area 24, and each of the second and third attachment portions 18a, 18b wraps around a side jamb 27).

The first, second, and third attachment portions 14, 18a, 18b can be integrally formed with the base portion 12 and/or the leg portions 16a, 16b. One or more of the portions of the doorway protection assembly 10 can be made of a rigid yet flexible material (e.g., plastic, nylon, sheet metal) such that the doorway protection assembly 10 can retain its general form factor while being able to bend and/or snap into place. For example, when installing the doorway protection assembly 10 in the doorway 22, the two leg portions 16a, 16b can be pushed toward each other (i.e., flexed relative to the base portion 12) such that the doorway protection assembly 10 can fit within the doorway 22. The first attachment portion 14 can then be positioned over the door sill area 24 and the two leg portions 16a, 16b can be released such that the second and third attachment features 18a, 18b wrap around the side jambs 27.

In some embodiments, the first, second, and third attachment portions 14, 18a, 18b can be disjointed (i.e., not in contact) with one another such that there are gaps between the first, second, and third attachment portions 14, 18a, 18b. The gaps may help the doorway protection assembly 10 fit into doorways 22 of various dimensions. In some embodiments, each of the first, second, and third attachment portions 14, 18a, 18b can include multiple portions, such as hooks that individually wrap around the doorway 22. In some embodiments, the first attachment portion 14 can have the same curvature and/or length as the second and third attachment portions 18a, 18b. In some embodiments, one or more of the first, second, and third attachment portions 14, 18a, 18b can include flat portions. In some embodiments, the first, second, and third attachment portions 14, 18a, 18b can be integrally formed yet separate from the base portion 12 and/or the leg portions 16a, 16b. In some embodiments, some or all of the portions of the doorway protection assembly 10 can be made as separate components configured to be coupled together.

Figure 3A:
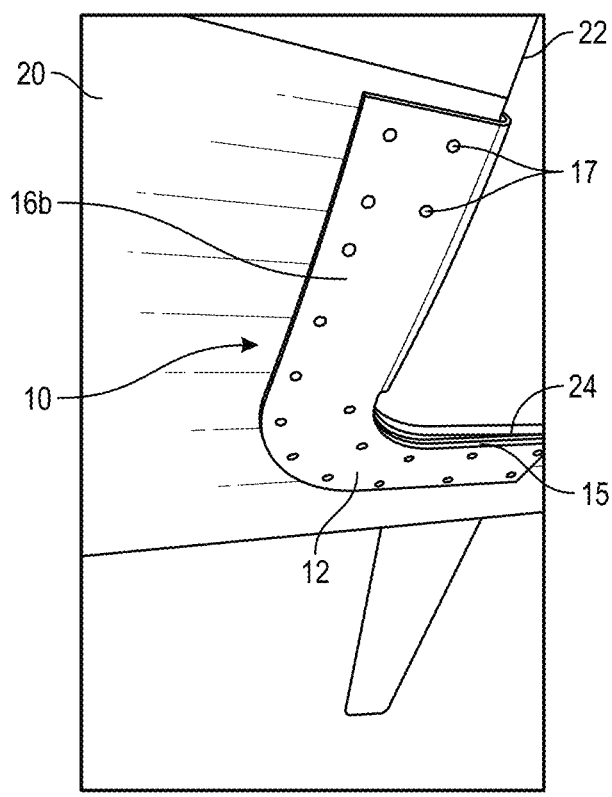
FIGS. 3A and 3B are isometric views showing a portion of the doorway protection assembly mounted to the lower perimeter portion of the doorway in accordance with embodiments of the present technology.
Figure 3B:
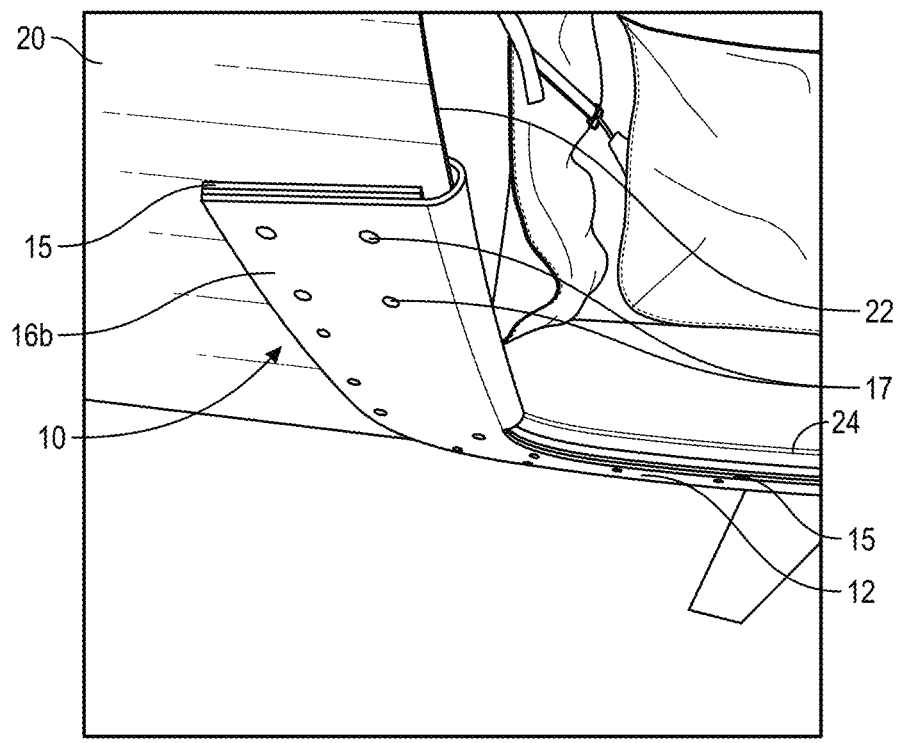

FIGS. 3A and 3B are schematic isometric views of portions of the doorway protection assembly 10 mounted on the doorway 22 of the aircraft 20. In the illustrated embodiment, the doorway protection assembly 10 includes one or more cushion layers 15 between the base portion 12 and/or the two leg portions 16a, 16b and the exterior of the aircraft 20. The cushion layer 15 can be made of impact absorptive material, such as durable foam, such that damage to the exterior of the aircraft 20 is avoided or reduced. The cushion layer 15 can be fixedly or removably coupled to the base portion 12 and/or the leg portions 16a, 16b via fasteners 17. In some embodiments, the cushion layer 15 can be coupled to the base portion 12 and/or the leg portions 16a, 16b via other mechanisms, such as adhesives. In some embodiments, the cushion layer 15 wraps around both sides of the base portion 12 and/or the two leg portions 16a, 16b.

Figure 4:
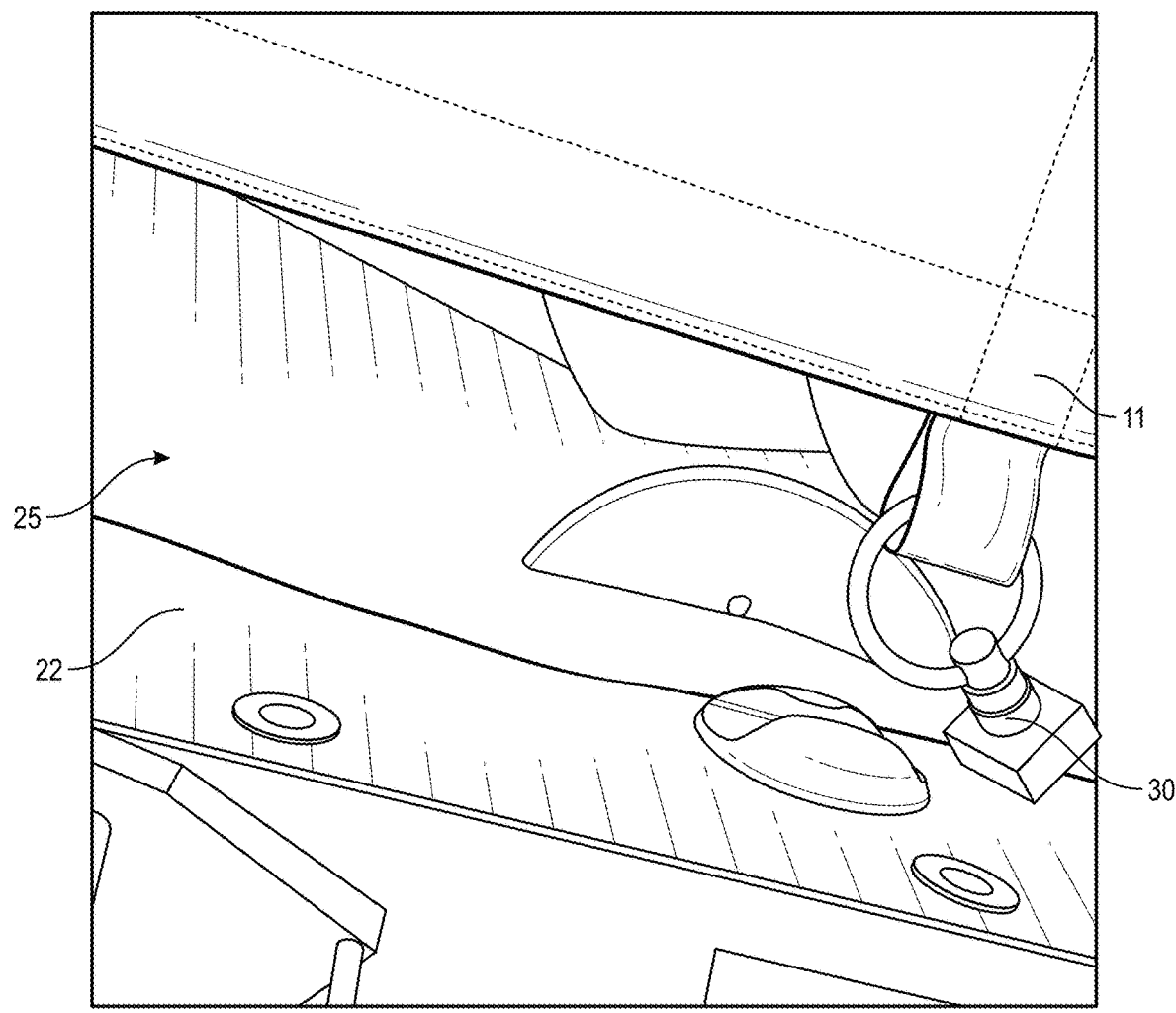
FIG. 4 illustrates an anchor member within the cargo area adjacent to the doorway to which retention straps releasably attach in accordance with embodiments of the present technology.

FIG. 4 illustrates an anchor 30 to which the retention straps 11 of the doorway protection assembly 10 can releasably attach. In the illustrated embodiment, the anchor 30 is positioned adjacent to the doorway 22 and inside the cargo area 25. The anchor 30 can include a hook, a ring, or other feature to which the retention straps 11 can releasably attach. The retention straps 11 help keep the rest of the doorway protection assembly 10 secured to the doorway 22 while cargo is moved into or out of the cargo area 25. In some embodiments, the retention straps 11 can be removably or fixedly attached to any portion of the base portion 12 and/or the two legs portions 16a, 16b.

An example method of using the doorway protection assembly 10 includes flexing the first leg portion 16a and the second leg portion 16b toward each other, disposing the assembly 10 in the vehicle doorway 22 such that the base portion 12 covers a first portion of a vehicle exterior below the vehicle doorway 22, and releasing the first and second leg portions 16a, 16b such that the first and second leg portions 16a, 16b cover second and third portions of the vehicle exterior to sides of the vehicle doorway 22. The example method can further include positioning the first attachment portion 14 over the door sill area 24. The example method can further include positioning the second attachment portion 18a over one of the side jambs 27 and positioning the second attachment portion 18b over the other side jamb 27. The example method can further include positioning the cushion layer 15 between the vehicle exterior and at least one of the base portion 12, the first leg portion 16a, and the second leg portion 16b. The example method can further releasably coupling the retention strap 11 to the anchor 30.

While preferred embodiments of the present disclosure have been shown and described herein, it will be obvious to those skilled in the art that such embodiments are provided by way of example only. It is not intended that the disclosure be limited by the specific examples provided within the specification. While the disclosure has been described with reference to the aforementioned specification, the descriptions and illustrations of the embodiments herein are not meant to be construed in a limiting sense. Numerous variations, changes, and substitutions will now occur to those skilled in the art without departing from the disclosure. It shall be understood that all aspects of the disclosure are not limited to the specific depictions, configurations, or relative proportions set forth herein, which depend upon a variety of conditions and variables. It should be understood that various alternatives to the embodiments of the disclosure described herein may be employed in practicing the disclosure. It is therefore contemplated that the disclosure shall also cover any such alternatives, modifications, variations, or equivalents. It is intended that the following claims define the scope of the disclosure and that methods and structures within the scope of these claims and their equivalents be covered thereby.

I claim:

1. A doorway protection assembly for use on an aircraft with a cargo doorway for accessing a cargo area, wherein the aircraft has first, second and third portions proximate to the cargo doorway, comprising:
    a base portion having a first curvature corresponding to the first portion of the aircraft proximate to the cargo doorway;
    a first leg portion connected to a first end portion of the base portion, wherein the first leg portion has a second curvature corresponding to the second portion of the aircraft proximate to the cargo doorway; and
    a second leg portion connected to a second end portion of the base portion, wherein the second leg portion has a third curvature corresponding to the third portion of the aircraft proximate to the cargo doorway;
    wherein the base portion, the first leg portion and second portion are movable as a unit between an installed position proximate to the cargo doorway to protect the first, second and third portions from damage, and a removed position wherein the base portion, the first leg portion and second portion are removed from the aircraft to allow a cargo door to close over the cargo doorway.

2. The assembly of claim 1, further comprising an attachment portion coupled to the base portion, wherein the attachment portion has a contour corresponding to a door sill area of the cargo doorway.

3. The assembly of claim 1, further comprising a first attachment portion coupled to the first leg portion and a second attachment portion coupled to the second leg portion, wherein each of the first and second attachment portions has a contour corresponding to a side jamb of the cargo doorway.

4. The assembly of claim 1, further comprising:
    a first attachment portion coupled to the base portion, wherein the first attachment portion has a contour corresponding to a door sill area of the cargo doorway;
    a second attachment portion coupled to the first leg portion, wherein the second attachment portion has a contour corresponding to a first side jamb of the cargo doorway; and
    a third attachment portion coupled to the second leg portion, wherein the third attachment portion has a contour corresponding to a second side jamb of the cargo doorway.

5. The assembly of claim 4, wherein the contour of the first attachment portion is different from the contours of the second and third attachment portions.

6. The assembly of claim 4, wherein the contours of the first, second, and third attachment portions are the same.

7. The assembly of claim 4, wherein the first, second, and third attachment portions form a continuous structure.

8. The assembly of claim 4, wherein the first, second, and third attachment portions are disjointed.

9. The assembly of claim 4, wherein the first attachment portion is integrally formed with the base portion, wherein the second attachment portion is integrally formed with the first leg portion, and wherein the third attachment portion is integrally formed with the second leg portion.

10. The assembly of claim 1, wherein the base portion, the first leg portion, and the second leg portion are integrally formed.

11. The assembly of claim 1, further comprising a cushion layer coupled to at least one of the base portion, the first leg portion, and the second leg portion.

12. The assembly of claim 1, further comprising a retention strap coupled to at least one of the base portion, the first leg portion, and the second leg portion.

13. A doorway protection assembly, comprising:
    a base portion configured to protect a first portion of a vehicle exterior proximate to a vehicle doorway;
    a first leg portion coupled to the base portion, wherein the first leg portion is configured to protect a second portion of the vehicle exterior proximate to the vehicle doorway;
    a second leg portion coupled to the base portion, wherein the second leg portion is configured to protect a third portion of the vehicle exterior proximate to the vehicle doorway;
    a first attachment portion coupled to the base portion, wherein the first attachment portion is configured to wrap over and protect a door sill area of the vehicle doorway;
    a second attachment portion coupled to the first leg portion, wherein the second attachment portion is configured to wrap over and protect a first side lamb of the vehicle doorway; and a third attachment portion coupled to the second leg portion, wherein the third attachment portion is configured to wrap over and protect a second side lamb of the vehicle doorway.

14. The assembly of claim 13, wherein the first portion of the vehicle exterior is below the vehicle doorway, and wherein the second and third portions of the vehicle exterior are to sides of the vehicle doorway.

15. A method of using a doorway protection assembly, comprising:
    flexing a first leg portion of the assembly and a second leg portion of the assembly toward each other, wherein the first and second leg portions are coupled to a base portion of the assembly;
    disposing the assembly in a vehicle doorway such that the base portion covers a first portion of a vehicle exterior below the vehicle doorway; and
    releasing the first and second leg portions such that the first and second leg portions cover second and third portions of the vehicle exterior to sides of the vehicle doorway.

16. The method of claim 15, further comprising:
positioning an attachment portion over a door sill area of the vehicle doorway, wherein the attachment portion is coupled to the base portion.

17. The method of claim 15, further comprising:
positioning a first attachment portion over a first side jamb of the vehicle doorway, wherein the first attachment portion is coupled to the first leg portion; and
positioning a second attachment portion over a second side jamb of the vehicle doorway, wherein the second attachment portion is coupled to the second leg portion.

18. The method of claim 15, further comprising:
positioning a cushion layer between the vehicle exterior and at least one of the base portion, the first leg portion, and the second leg portion.

19. The method of claim 15, further comprising:
releasably coupling a retention strap to an anchor disposed proximate to the vehicle doorway,
wherein the retention strap is coupled to at least one of the base portion, the first leg portion, and the second leg portion.

* * * * *